United States Patent [19]

Leiter

[11] Patent Number: 5,022,744
[45] Date of Patent: Jun. 11, 1991

[54] MICROSCOPE WITH A CAMERA AND AUTOMATIC COLOR TEMPERATURE BALANCE

[75] Inventor: Herbert Leiter, Wetzlar, Fed. Rep. of Germany

[73] Assignee: Wild Leitz GmbH, Wetzlar, Fed. Rep. of Germany

[21] Appl. No.: 343,369

[22] Filed: Apr. 26, 1989

[30] Foreign Application Priority Data

Apr. 26, 1988 [DE] Fed. Rep. of Germany ....... 3814006

[51] Int. Cl.⁵ .................. G02B 21/26; G02B 21/00
[52] U.S. Cl. .................................. 350/530; 350/507; 350/523; 350/526
[58] Field of Search .................. 350/507–536, 96.2, 331 R, 314–315, 130–143; 362/32, 261; 354/77–79, 428, 430, 100–102

[56] References Cited

U.S. PATENT DOCUMENTS

| | | | |
|---|---|---|---|
| 3,987,463 | 10/1976 | Nishikawa et al. | 354/79 |
| 4,041,308 | 8/1977 | Fujita | 354/430 |
| 4,233,650 | 11/1980 | Hagner et al. | 362/32 |
| 4,361,863 | 11/1982 | Hagner | 362/32 |
| 4,511,229 | 4/1985 | Schwartz et al. | 354/430 |
| 4,673,269 | 6/1987 | Schiff et al. | 354/76 |
| 4,751,542 | 6/1988 | Madero | 354/430 |
| 4,824,229 | 4/1989 | Narita et al. | 350/507 |

FOREIGN PATENT DOCUMENTS

2757543  6/1979  Fed. Rep. of Germany .
3627354  1/1988  Fed. Rep. of Germany .

Primary Examiner—Bruce Y. Arnold
Assistant Examiner—Thong Nguyen
Attorney, Agent, or Firm—Foley & Lardner

[57] ABSTRACT

A microscope is disclosed having an illumination device that includes a color temperature regulating device and a color temperature measurement device. The color temperature regulating device includes a light guide and two conversion filters that are disposed on a carrier and are adjustable in a motor-driven manner. Moreover, a color temperature control device is provided, which compares the color temperature determined in the measurement device with a predetermined theoretical value and supplies a corresponding signal to the color temperature regulating device. Furthermore, a measurement or regulating device for the intensity of illumination or light intensity is provided, which compensates the change of light intensity by a motor-controllable diaphragm in the illumination beam path.

5 Claims, 2 Drawing Sheets

MICROSCOPE WITH A CAMERA AND AUTOMATIC COLOR TEMPERATURE BALANCE

BACKGROUND OF THE INVENTION

The invention relates to a microscope including an illumination device. More specifically, the invention relates to a microscope in which the intensity and color temperature of light is regulated.

German Offenlegungsschrift 2,757,543 discloses an illumination device for a microscope. Proceeding from a light source, this illumination device exhibits a condenser system and an annularly curved light guide. Between the condenser system and the light guide there is disposed a filter device, which exhibits, on a carrier, a plurality of individual filters disposed side by side.

By manual movement of this device in the illumination beam path, the illumination light is matched to a specified color temperature in accordance with the filter brought into the working position.

The measurement of the color temperature takes place by a separate measuring system which is disposed on the tube of the microscope. However, for this purpose it is necessary to remove the existing accessory devices, such as for example, a photographic camera, and to replace them by the color temperature measurement system. A particular disadvantage in this case is the awkward incorporation of the color temperature measurement system and the danger, associated therewith, of having to adjust once again the microscope which has already been adjusted. Furthermore, such an arrangement is affected by the disadvantage that the intensity of illumination in the microscope is altered by the regulation of the color temperature. A matching of the intensity of illumination by regulating the lamp voltage is not possible in this case, since an altered lamp voltage alters the color temperature of the illumination light.

Furthermore, German Offenlegungsschrift 3,627,354 discloses a microphotographic device as a separate accessory of a microscope. This device exhibits a photographic camera, a light measurement device as well as a color temperature measurement device. The color temperature measurement device includes two photodiodes with an upstream blue or red filter. Both photodiodes are acted upon simultaneously by light by means of an appropriate optical system. The light measurement device as well as the photodiodes are connected to a control device via electrical conductors. By inserting a deflecting mirror into the measurement beam path, the light measurement device or the color temperature measurement device may selectively be activated. This microphotographic device has proved to be effective in practice, but does not include any device for matching and regulating the color temperature of the microscope light.

SUMMARY OF THE INVENTION

It is thus the object of the present invention to simplify the regulation of the color temperature of the microscope light in such a manner that an exact and rapid color temperature setting is guaranteed without undertaking manipulations on the microscope.

This and other objects are achieved by a microscope having an illumination device that includes a light guide, a filter device disposed in an illumination beam path between a light source and the light guide, for regulating the color temperature of light passing through the light guide, the filter device including a carrier having at least one filter continuously adjustable in the illumination beam path; and having a color temperature measurement device, wherein a red conversion filter and a blue conversion filter are disposed on a carrier beside one another, an optically transparent slit is provided between the filter, and a motor-driven adjustment mechanism is coupled with the carrier, and a color temperature central device is electrically connected to the motor and the color temperature measurement device.

BRIEF DESCRIPTION OF THE DRAWINGS

An illustrative embodiment of the present invention is schematically represented in the drawings.

DETAILED DESCRIPTION OF THE PREFERRED EMBODIMENTS

Figure 1:
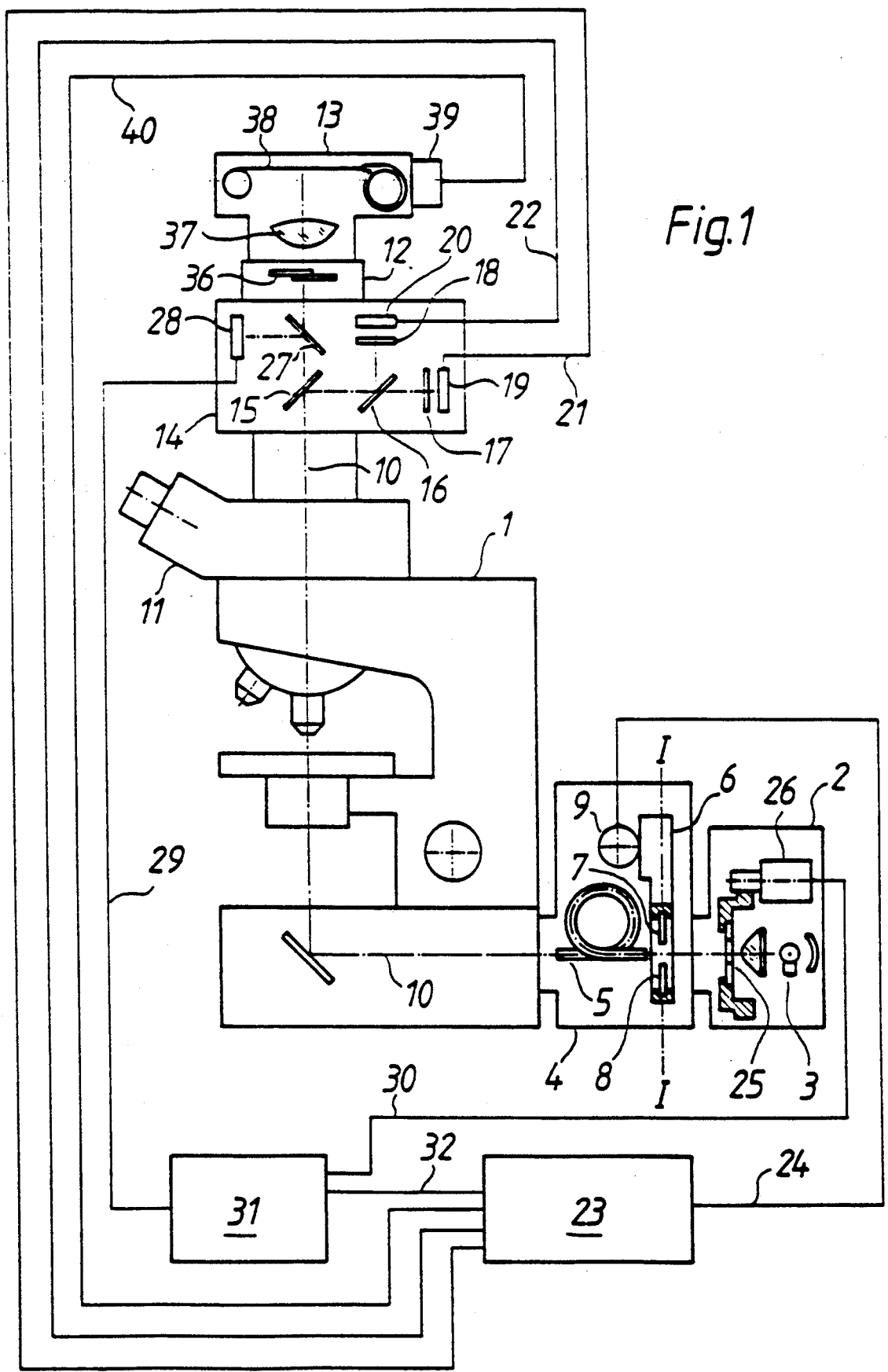
FIG. 1 shows a microscope with a camera and automatic color temperature balance according to the present invention, as viewed from the side.

FIG. 1 shows a side view of a microscope 1 having a lamp house 2, which is disposed at the foot of the microscope and which includes an illumination device 3. A color temperature regulating device 4 is disposed between lamp house 2 and microscope 1. This device includes, in addition to a light guide 5, which is annularly curved and which has a homogeneous interior, two color filters 7 and 8 disposed on a carrier 6. By means of an electric motor 9, the carrier 6 is designed to be adjustable in a direction perpendicular to the illumination beam path 10 of the microscope 1. The filters 7 and 8 are mounted at a spacing from one another on the carrier 6. This provided slit 41 corresponds to the approximate diameter of the light guide 5, in order to be able, in the event of the adjustment of the carrier 6 so that the slit 41 is in the illumination beam path 10 to thereby achieve a position in which no filter is situated in the operative positions.

Furthermore, the microscope 1 has, above its eyepiece part 11, a shutter part 12 of a photographic camera 13. The color temperature measurement device 14 is disposed below the shutter part 12. This device includes, in the beam path 10, a partially transmitting mirror 15, which directs a path of the light onto a further partially transmitting mirror 16. By means of this second mirror 16, two color filters 17 and 18 disposed vertically in the beam path are simultaneously acted upon by light. The filter 17 is designed as a red filter, and the filter 18 as a blue filter. The photoelectric elements 19 and 20 disposed behind the respective filters are electrically connected to a color temperature control device 23 via electrical conductors 21 and 22. The motor 9, provided in the color temperature regulating device 4 for adjusting the carrier 6 in a direction perpendicular to the illumination beam path 10 of the microscope 1, is connected to the control device 23 via an electrical conductor 24.

A partially transmitting mirror 27 is disposed in the color temperature device 14 in the further course of the beam path 10, which mirror directs a part of the light onto a photoelectric element 28.

A diaphragm 25 regulatable by means of a motor 26 is disposed in the lamp house 2, in order to keep the intensity of illumination of the microscope light constant. The photoelectric element 28 and the motor 26 are connected via respective electrical conductors 29 and 30 to a regulating device 31 for adjusting the intensity of illumination, which device is connected via a conductor 32 to the color temperature control device 23.

The camera shutter 36 is disposed above the partially transmitting mirror 27 in the shutter part 12. A photographic lens 37 and the film plane 38 of the camera 13 are positioned in the further course of the beam path 10. Furthermore, the shutter part exhibits a device 39 for the detection of the parameters characterizing the film. The parameters, such as, for example, film type, film length, film speed and color sensitivity, are transferred into the color temperature control device 23 via an electrical conductor 40 (DX coding).

Figure 2:
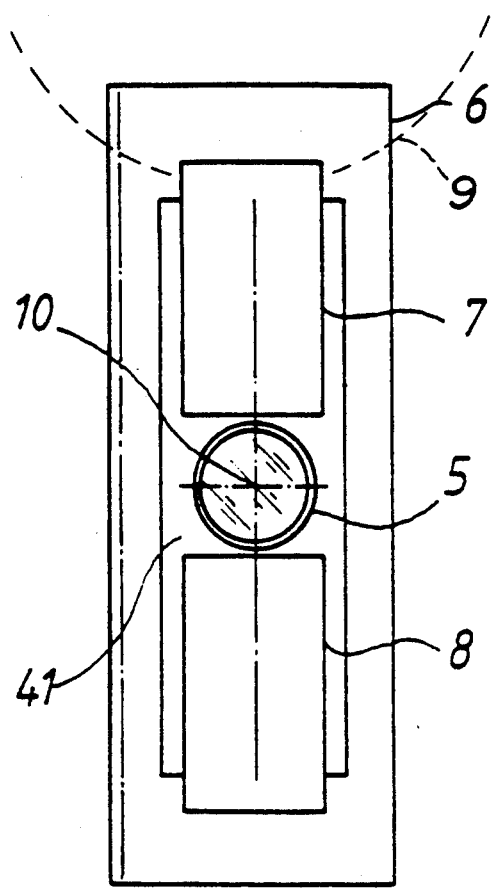
FIG. 2 shows a cross-section along the line I—I shown in FIG. 1 of the color temperature regulating device.

FIG. 2 shows a cross-section along the line I—I of FIG. 1 of the color temperature regulating device 4. The two filters 7 and 8 are fixedly disposed on the carrier 6 and can be constructed with a continuously varying density. In this case, the filter 7 is designed as a red conversion filter, and the filter 8 as a blue conversion filter. The spacing of the two filters from one another was matched to the diameter of the light guide 5. The carrier may be adjusted in a motor-driven manner by means of the motor 9, which is only diagrammatically represented, so that the filters 7 and 8 respectively are continuously movable in front of the light guide 5.

Figure 3:
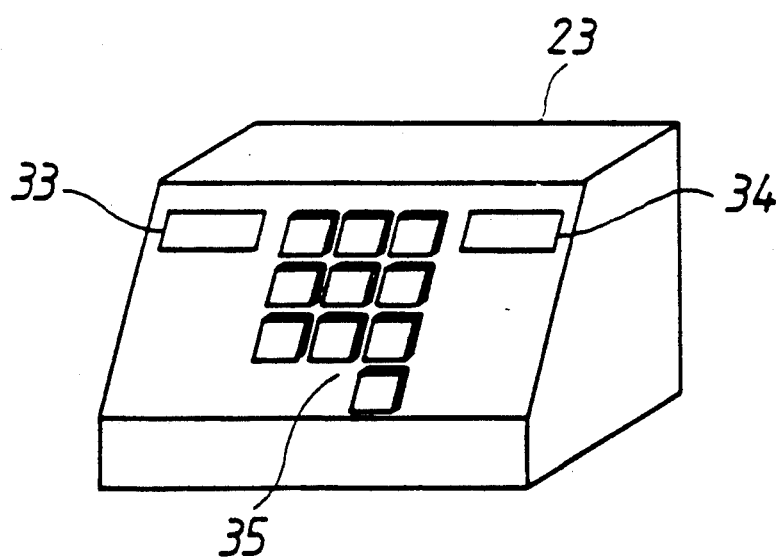
FIG. 3 shows display and operating elements of the color temperature control device.

FIG. 3 shows the indicating and operating elements of the color temperature control device 23. Two indicating elements 33 and 34 are provided; in this case, the element 34 serves for the indication of the color temperature which is preselectable by means of a keyboard 35. The color temperature, which is set in the microscope 1 by means of the filters 7 and 8 respectively and which is measured by means of the photoelectric elements 19 and 20, is indicated on the element 33.

By preselecting a specified color temperature by means of the keyboard 35 or by transfer of the color sensitivity from the device 39 into the color temperature control device 23, the color temperature of the illumination light is measured by means of the color temperature measurement device via the photoelectric elements 19 and 20, and is supplied via the conductors 21 and 22 respectively to the control device 23. There, the difference between measured and preselected color temperature is determined, and a corresponding signal is supplied via the conductor 24 to the motor 9. This signal is assessed in such a manner that in the case of a color temperature which is too high the red conversion filter 7 and in the case of a color temperature which is too low the blue conversion filter 8 is swung into the illumination beam path. During the insertion of the appropriate filter into the illumination beam path 10, the color temperature is continuously measured in the measurement device 14, and the corresponding signals are supplied to the color temperature control device 23 until such time as there is no difference between measured and preselected color temperature. After the balancing of the color temperature, the corresponding control signal for the motor 9 is deactivated.

By insertion of a filter into the illumination beam path, the intensity of illumination in the microscope has been altered. This alteration is measured by means of the photoelectric element 28 and, supplied to the regulating device 31 for the intensity of illumination. This, in turn, controls the motor 26, which opens or closes the diaphragm 25. In a manner similar to the balancing of the color temperature, the diaphragm is adjusted to such an extent that the alteration of the illumination due to the color filter is compensated.

Finally, it should be pointed out that the described construction represents only an example. The most widely different variants are, of course, feasible, in particular in the construction of the regulating devices with their operating elements. The fixedly disposed partially transmitting mirrors described in the illustrative embodiment can, of course, be replaced by mirrors which can be swung out or alternatively prisms. The device for measuring and regulating the intensity of illumination can, moreover, be used for the determination of the exposure time for the photographic camera, having regard to the parameters of the film employed.

What is claimed is:

1. A microscope comprising:
   illumination means for generating a first light;
   a carrier having a first and second optical filter and a provided slit, said provided slit being situated between said first and said second optical filters and said first light passing through said carrier resulting in a second light;
   motor means for moving said carrier thereby varying a color temperature of said second light;
   light guide means for receiving and redirecting said second light as redirected light, said provided slit corresponding to a diameter of said light guide means;
   color temperature measuring means for measuring color temperature of said redirected light and outputting color temperature data;
   color temperature control means for receiving said color temperature data and for correspondingly driving said motor means thereby controlling said color temperature of said second light;
   means for regulating intensity of said redirected light; and
   wherein said means for regulating intensity is connected to said color temperature control means, for compensating any change of said intensity of said redirected light resulting from varying said color temperature of said second light.

2. The microscope as claimed in claim 1, further comprising a photographic camera including detecting means for detecting film parameters characterizing a film in said photographic camera, said detecting means is electrically connected to said color temperature control means and said detecting means outputs said film parameters to said color temperature control means.

3. The microscope as claimed in claim 2, wherein said color temperature control means controls said means for regulating intensity, thereby controlling said intensity of said redirected light based on said film parameters detected by said detecting means.

4. The microscope as claimed in claim 1, wherein said first optical filter is red and said second optical filter is blue.

5. A microscope comprising:
   illumination means for generating a first light;
   a carrier having a first and second optical filter and a provided slit, said provided slit being situated between said first and said second optical filters and said first light passing through said carrier resulting in a second light;

motor means for moving said carrier thereby varying a color temperature of said second light;

light guide means for receiving and redirecting said second light as redirected light, said provided slit corresponding to a diameter of said light guide means;

color temperature measuring means for measuring color temperature of said redirected light and outputting color temperature data;

color temperature control means for receiving said color temperature data and for correspondingly driving said motor means thereby controlling said color temperature of said second light; and a photographic camera including detecting means for detecting film parameters characterizing a film in said photographic camera, said detecting means is electrically connected to said color temperature control means and said detecting means outputs said film parameters to said color temperature control means.

* * * * *